(12) United States Patent
Tang et al.

(10) Patent No.: US 12,187,887 B2
(45) Date of Patent: Jan. 7, 2025

(54) RESIN COMPOSITION, PREPREG, LAMINATE AND METAL FOIL-CLAD LAMINATE

(71) Applicant: Shengyi Technology Co., Ltd., Guangdong (CN)

(72) Inventors: Junqi Tang, Guangdong (CN); Zhiguang Li, Guangdong (CN)

(73) Assignee: SHENGYI TECHNOLOGY CO., LTD., Dongguan Guangdong (CN)

( * ) Notice: Subject to any disclaimer, the term of this patent is extended or adjusted under 35 U.S.C. 154(b) by 770 days.

(21) Appl. No.: 17/415,620

(22) PCT Filed: Dec. 29, 2018

(86) PCT No.: PCT/CN2018/125776
§ 371 (c)(1),
(2) Date: Jun. 17, 2021

(87) PCT Pub. No.: WO2020/133472
PCT Pub. Date: Jul. 2, 2020

(65) Prior Publication Data
US 2022/0056260 A1    Feb. 24, 2022

(51) Int. Cl.
| | |
|---|---|
| C08G 59/62 | (2006.01) |
| B32B 5/02 | (2006.01) |
| B32B 15/12 | (2006.01) |
| B32B 15/14 | (2006.01) |
| B32B 15/20 | (2006.01) |
| B32B 29/00 | (2006.01) |
| B32B 29/02 | (2006.01) |
| C08J 5/24 | (2006.01) |
| C08K 3/013 | (2018.01) |
| C08L 33/08 | (2006.01) |
| C08L 33/20 | (2006.01) |
| C08L 63/00 | (2006.01) |
| C08L 63/04 | (2006.01) |

(52) U.S. Cl.
CPC ............ *C08L 63/00* (2013.01); *C08G 59/621* (2013.01); *C08J 5/244* (2021.05); *C08K 3/013* (2018.01)

(58) Field of Classification Search
None
See application file for complete search history.

(56) References Cited

U.S. PATENT DOCUMENTS

| | | | |
|---|---|---|---|
| 2015/0259489 A1 | 9/2015 | Umehara et al. | |
| 2016/0366761 A1 | 12/2016 | Hoshi et al. | |
| 2019/0263087 A1* | 8/2019 | Kashihara | ................ B32B 5/26 |

FOREIGN PATENT DOCUMENTS

| | | |
|---|---|---|
| CN | 103304949 A | 9/2013 |
| CN | 104908389 A | 9/2015 |
| CN | 106243627 A | 12/2016 |
| CN | 108239372 A | 7/2018 |
| JP | 2016102200 A * | 6/2016 |
| JP | 2017002134 A * | 1/2017 |

(Continued)

OTHER PUBLICATIONS

European Search Report issued on Jul. 13, 2022 in corresponding Patent Application No. 18945277.4-1107.

(Continued)

*Primary Examiner* — Randy P Gulakowski
*Assistant Examiner* — Ha S Nguyen
(74) *Attorney, Agent, or Firm* — NORTON ROSE FULBRIGHT US LLP

(57) ABSTRACT

An epoxy resin composition, and a prepreg, a laminate, and a metal foil-clad laminate manufactured using same. The epoxy resin composition comprises epoxy resin (A), phenolic curing agent (B), high molecular weight resin (C), and an optional inorganic filler (D), the high molecular weight resin (C) having the structure shown in formula (1), formula (2), formula (3), and formula (4), the weight-average molecular weight being between 100,000 and 200,000, and the content of the epoxy resin (A) containing a naphthalene ring skeleton and the phenolic curing agent (B) containing a naphthalene ring skeleton being 0%. The present epoxy resin composition, and the prepreg, the laminate, and the metal foil-clad laminate manufactured using same have good heat resistance, low modulus, and a low coefficient of thermal expansion. The formulas are:

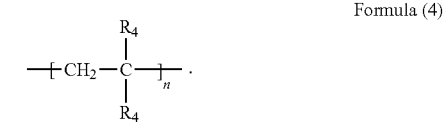

20 Claims, No Drawings

(56) References Cited

FOREIGN PATENT DOCUMENTS

| | | |
|---|---|---|
| JP | 2018150510 A | 9/2018 |
| WO | 2017183621 A1 | 10/2017 |
| WO | WO-2018021113 A1 * | 2/2018 ............. B32B 15/08 |
| WO | 2018105691 A1 | 6/2018 |

OTHER PUBLICATIONS

International Search Report issued in PCT/CN2018/125776 on Sep. 26, 2019.

* cited by examiner

RESIN COMPOSITION, PREPREG, LAMINATE AND METAL FOIL-CLAD LAMINATE

CROSS REFERENCE TO RELATED APPLICATIONS

This application is a national phase under 35 U.S.C. § 371 of International Application No. PCT/CN2018/125776 filed on Dec. 29, 2018, which is hereby incorporated by reference in its entirety.

TECHNICAL FIELD

The present invention relates to the technical field of packages for electronic products, in particular to a resin composition, a prepreg, a laminate, and a metal foil-clad laminate manufactured using the same.

BACKGROUND ART

With the development of packaging forms, the packaging density is getting higher and higher, e.g. POP packaging (package stack technology), MCP packaging (multi-chip packaging) and etc. The requirements on the coefficient of thermal expansion (CTE) and rigidity of the packaging substrate are increasing. For packages with a single package form, such as BGA packaging (ball grid array packaging), the package substrates having low CTE in the XY directions and high rigidity can show an effect of reducing warpage. However, packages with a complex packaging form are obviously not applicable because of its fixedness and different requirements on warpage of different parts. At the same time, the thermal stress generated during the installation process of the chip and other components cannot be relieved, which is extremely easy to cause cracking of the pad and causes the circuit failure. Moreover, the continuously increasing of the temperature of the use environment also puts forward higher requirements on the heat resistance of the package substrates.

Contents of the Invention

The object of the present invention is to provide a resin composition. The prepregs, laminates, and metal foil-clad laminates manufactured using the resin composition have good heat resistance, low modulus and low coefficient of thermal expansion.

In order to achieve the object above, the following technical solutions are adopted in the present invention.

One aspect of the present invention lies in providing an epoxy resin composition comprising an epoxy resin (A), a phenolic curing agent (B), a high molecular-weight resin (C), and an optional inorganic filler (D), wherein the high molecular-weight resin (C) has structures shown in Formulae (1), (2), (3) and (4), and a weight-average molecular weight of 100,000-200,000; the content of the epoxy resin (A) containing a naphthalene ring skeleton and the phenolic curing agent (B) containing a naphthalene ring skeleton is 0%.

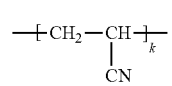

Formula (1)

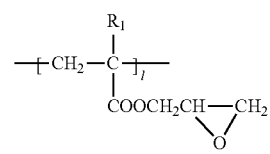

Formula (2)

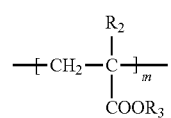

Formula (3)

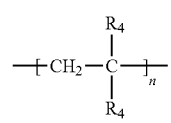

Formula (4)

wherein k, l, m and n are mole fractions; k+l+m+n≤1; 0≤k≤0.10; 0.01≤l≤0.30; 0.20≤m≤0.80; 0.05≤n≤0.20; in Formula (2), $R_1$ is a hydrogen atom or an alkyl group with 1-8 carbon atoms; in Formula (3), $R_2$ and $R_3$ are each independently a hydrogen atom or an alkyl group with 1-8 carbon atoms; in Formula (4), $R_4$ is a hydrogen atom or an alkyl group with 1-8 carbon atoms, and $R_5$ is selected from the group consisting of an alkyl group with 1-8 carbon atoms, phenyl (Ph), —COO(CH$_2$)$_2$Ph and —COOCH$_2$Ph.

Optionally, $R_1$ is a hydrogen atom or a methyl group; $R_2$ is a hydrogen atom or a methyl group; $R_3$ is an alkyl group with 1-8 carbon atoms; and $R_4$ is a hydrogen atom or a methyl group.

Optionally, the epoxy resin (A) and/or the phenolic curing agent (B) contain(s) an aralkyl group or a dicyclopentadiene structure.

Optionally, the high molecular-weight resin (C) is present in an amount of 10-90 parts by weight, preferably 20-85 parts by weight, and more preferably 30-70 parts by weight, based on the total weight of the epoxy resin (A) and the phenolic curing agent (B) as 100 parts by weight.

Optionally, the inorganic filler (D) is present in an amount of 0 to 100 parts by weight, preferably 10 to 70 parts by weight, based on the total weight of the epoxy resin (A) and the phenolic curing agent (B) as 100 parts by weight.

Another aspect of the present invention lies in providing a prepreg, comprising a substrate and the epoxy resin composition above attached to the substrate by impregnation or coating.

Another aspect of the present invention lies in providing a laminate, comprising at least one prepreg above.

Another aspect of the present invention lies in providing a metal foil-clad laminate, comprising at least one prepreg above and metal foil(s) covered on one or both sides of the prepreg(s).

The resin composition provided by the present invention has the advantages of good heat resistance, low coefficient of thermal expansion and low modulus. The prepregs, laminates and metal foil-clad laminates prepared by using the resin composition have good heat resistance, low coefficient of thermal expansion and modulus, which helps reducing the warpage of the package substrates and are suitable for packages with variable package forms.

EMBODIMENTS

In order to better explain the present invention, some specific embodiments of the present invention are described in detail. The embodiments of the present invention, however, are not limited to these below, and various modifications can be made within the scope of the claims.

The epoxy resin composition of the present invention comprises an epoxy resin (A), a phenolic curing agent (B), a high molecular-weight resin (C) and an optional inorganic filler (D), and may further comprises an optional curing accelerator (E) and other additives. Among them, the epoxy resin (A) and the phenolic curing agent (B) are used as the matrix resin, and each component will be described in detail below.

—Matrix Resin(Epoxy Resin(A)+Phenolic Curing Agent (B))—

Except for using no epoxy resin containing a naphthalene ring skeleton or phenolic curing agent containing a naphthalene ring skeleton, the present invention has no particular limitation on the epoxy resin (A) and phenolic curing agent (B) constituting the matrix resin. Epoxy resins and phenolic curing agents well known can be selected.

The structures of the epoxy resin and the phenolic curing agent of the present invention do not contain a naphthalene ring skeleton, thereby reducing the rigidity of the matrix resin to make the prepregs, laminates and metal foil-clad laminates prepared from the resin composition have low modulus.

The epoxy resin (A) used in the present invention is selected from the group consisting of organic compounds containing at least two epoxy groups in the molecular structure, and examples thereof may include bisphenol A type epoxy resin, bisphenol E type epoxy resin, bisphenol F type epoxy resin, tetramethyl bisphenol F type epoxy resin, bisphenol M type epoxy resin, bisphenol P type epoxy resin, bisphenol S type epoxy resin, novolac type epoxy resin, cresol novolac epoxy resin, bisphenol A novolac epoxy resin, brominated bisphenol A epoxy resin, brominated novolac epoxy resin, trifunctional phenolic epoxy resin, tetrafunctional phenolic epoxy resin, phenoxy epoxy resin, biphenyl type epoxy resin, dicyclopentadiene type epoxy resin, dicyclopentadiene novolac epoxy resin, aralkyl type epoxy resin, aralkyl novolac epoxy resin, isocyanate modified epoxy resin, cycloaliphatic epoxy resin, polyol type epoxy resin, phosphorus-containing epoxy resin, silicon-containing epoxy resin, nitrogen-containing epoxy resin, bromine-containing epoxy resin, glycidylamine, glycidol esters, and compounds obtained by epoxidation of double bonds of butadiene and the like, etc. These epoxy resins mentioned above can be used individually or in combination as needed.

The phenolic curing agent (B) used in the present invention is selected from the group consisting of organic compounds containing at least two phenol groups in the molecular structure, such as phenol resins, including phenolic novolac resins, cresol novolac resins and the like. Except for the phenolic curing agent containing a naphthalene ring skeleton in the structure, all the phenolic curing agent which is well known and used in epoxy resin compositions can be selected, and it may be one selected therefrom or a mixture of at least two selected therefrom.

The inventor found that, when the epoxy resin (A) and/or the phenolic curing agent (B) (i.e. at least one of the epoxy resin and the phenolic curing agent) contain(s) an aralkyl group or a dicyclopentadiene structure, it can make the resin composition of the present invention have a low modulus and at the same time a higher heat resistance and a lower coefficient of thermal expansion. The epoxy resin containing an aralkyl group may be selected from the group consisting of aralkyl type epoxy resins, aralkyl novolac type epoxy resins and the like. The epoxy resin containing a dicyclopentadiene group may be selected from the group consisting of dicyclopentadiene type epoxy resins, dicyclopentadiene novolac type epoxy resins and the like. The phenolic curing agent containing an aralkyl group can be selected from the group consisting of aralkyl type novolac resins and the like. The phenolic curing agent containing a dicyclopentadiene group can be selected from the group consisting of dicyclopentadiene type novolac resins and the like.

The amounts of the epoxy resin and the phenolic curing agent are not particularly limited, as long as the laminate and the metal foil-clad laminate can be fully cured under certain curing conditions.

—High molecular-weight resin (C)—

The high molecular-weight resin (C) of the present invention has structures shown in Formulae (1), (2), (3) and (4), and a weight-average molecular weight of 100,000-200,000.

Formula (1)

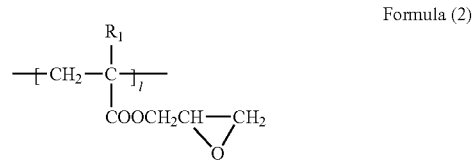

Formula (2)

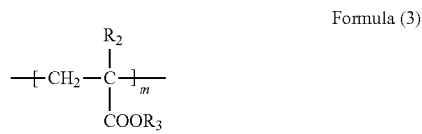

Formula (3)

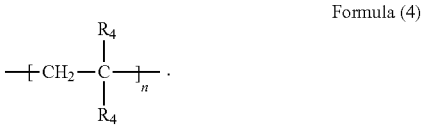

Formula (4)

wherein k, l, m and n are mole fractions; $k+l+m+n \leq 1$; $0 \leq k \leq 0.10$; $0.01 \leq l \leq 0.30$; $0.20 \leq m \leq 0.80$; $0.05 \leq n \leq 0.20$; in Formula (2), $R_1$ is a hydrogen atom or an alkyl group with 1-8 carbon atoms; in Formula (3), $R_2$ and $R_3$ are each independently a hydrogen atom or an alkyl group with 1-8 carbon atoms; in Formula (4), $R_4$ is a hydrogen atom or an alkyl group with 1-8 carbon atoms, and $R_5$ is selected from the group consisting of an alkyl group with 1-8 carbon atoms, phenyl (Ph), —COO(CH$_2$)$_2$Ph and —COOCH$_2$Ph.

Optionally, $R_1$ is a hydrogen atom or a methyl group; $R_2$ is a hydrogen atom or a methyl group; $R_3$ is an alkyl group with 1-8 carbon atoms; and $R_4$ is a hydrogen atom or a methyl group.

In the high molecular-weight resin (C) having structures represented by at least Formulae (2), (3) and (4) in Formulae (1), (2), (3) and (4), the order of the structures of Formulae (1), (2), (3) and (4) is not limited, and the structures of Formula (1), (2), (3) or (4) can be continuous or discontinuous.

The structure of Formula (2) in the high molecular-weight resin (C) contains an epoxy group, which can increase the curing strength of the high molecular-weight resin (C) and the matrix resin, thereby improving the heat resistance and moisture and heat resistance of the resin composition. Regarding the content of epoxy groups, the content of the structure of Formula (2) in the high molecular-weight resin (C) can be 0.01-0.30 (in mole fraction). The epoxy value of the high molecular-weight resin (C) can be within the range of 0.10-0.80 eq/kg, and the epoxy value is the equivalent number of epoxy groups in 1 kg of high molecular-weight resin (C). If the epoxy value of the high molecular-weight resin (C) is less than 0.10 eq/kg, the number of epoxy groups that can react with the phenolic curing agent in the high molecular-weight resin (C) is insufficient. The high molecular-weight resin (C) is in a rubbery state in the resin composition, and has poor compatibility with other components in the resin composition, the heat resistance of the prepregs, laminates and metal foil-clad laminates decreases. If the epoxy value of the high molecular-weight resin (C) is higher than 0.80 eq/kg, the cross-linking density of the high molecular-weight resin (C) and the resin composition increases; the elasticity of the laminates and the metal foil-clad laminates decreases; and the modulus increases.

The high molecular-weight resin (C) has a weight-average molecular weight of 100,000 to 200,000. If the weight-average molecular weight of the high molecular-weight resin (C) is less than 100,000, the heat resistance of the high molecular-weight resin (C) deteriorates. If the weight-average molecular weight of the high molecular-weight resin (C) is higher than 200,000, the compatibility of the high molecular-weight resin (C) with other components of the resin composition will become worse. Moreover, the varnish liquid (first-stage state) of the resin composition will have excessive viscosity, which affects the dispersion uniformity of the inorganic filler (D) in the resin composition and the wettability of the varnish liquid of the resin composition to the substrate. The weight-average molecular weight data of the present invention is obtained by the method specified in GB/T 21863-2008, and is determined by gel permeation chromatography(GPC) based on polystyrene calibration.

Based on 100 parts by weight of the total weight of the epoxy resin (A) containing no naphthalene ring skeleton and the phenolic curing agent (B) containing no naphthalene ring skeleton, the amount of the high molecular-weight resin (C) ranges from 10 to 90 parts by weight, preferably 20 to 85 parts by weight, more preferably 30 to 70 parts by weight. If the content of the high molecular-weight resin (C) is too low, the resin compositions, prepregs, laminates, and metal foil-clad laminates do not have low modulus characteristics. If the content of the high molecular-weight resin (C) is too high, the viscosity of the resin composition in the varnish state will be too high to be difficult to effectively impregnate the substrate. Since the cross-linking density of the high molecular-weight resin (C) and the matrix resin is low, the heat resistance of the resin compositions, prepregs, laminates, and metal foil-clad laminates is reduced.

—Inorganic filler (D)—

The inorganic filler (D) of the present invention can not only increase the heat resistance of the resin composition and the laminate, but also improve the dimensional stability of the laminate and the metal foil-clad laminate, and reduce the coefficient of thermal expansion and the cost.

The type of inorganic filler (D) is not limited, and can be one or more selected from the group consisting of crystalline silica, fused silica, amorphous silica, spherical silica, hollow silica, aluminum hydroxide, magnesium hydroxide, boehmite, molybdenum oxide, zinc molybdate, titanium dioxide, zinc oxide, boron nitride, aluminum nitride, silicon carbide, aluminum oxide, composite silicon powder, glass powder, short glass fiber and hollow glass. In order to make the resin composition have higher heat resistance, moisture and heat resistance and dimensional stability, one or more can be selected from the group consisting of crystalline silica, fused silica, amorphous silica, spherical silica, hollow silica, aluminum hydroxide, magnesium hydroxide, boehmite, boron nitride, aluminum nitride, silicon carbide, alumina, composite silicon powder, glass powder, short glass fiber and hollow glass, more preferably spherical silica.

Based on 100 parts by weight of the total weight of the epoxy resin (A) containing no naphthalene ring skeleton and the phenolic curing agent (B) containing no naphthalene ring skeleton, the amount of the inorganic filler (D) can be 0-100 parts by weight. From the viewpoint of improving the heat resistance and moisture and heat resistance of the resin composition without increasing the modulus of the resin composition, it is preferably 10 to 70 parts by weight.

In order to improve the compatibility of the inorganic filler (D) with the resin composition, a coupling agent can be added for surface treatment. The coupling agent is not limited, and is generally selected from silane coupling agents. The type of silane coupling agent is not limited. Examples include epoxy silane coupling agents, amino silane coupling agents, vinyl silane coupling agents, styryl silane coupling agents, isobutenyl silane coupling agent, propenyl silane coupling agent, ureido silane coupling agent, mercapto silane coupling agent, chloropropyl silane coupling agent, sulfide-based silane coupling agent, isocyanate-based silane coupling agent, etc.

—Curing accelerator (E) and other additives

In order to completely cure the resin composition, into the resin composition of the present invention may also be added an accelerator (E) as required. The accelerator (E) is selected from the group consisting of the curing accelerators that can promote epoxy resins and phenolic curing agents, specifically organic salts of metals such as copper, zinc, cobalt, nickel, manganese and so on, imidazoles and their derivatives, tertiary amines, etc., and may be used alone or in combination.

In addition, in order to make the resin composition have better processability and usability, various additives as needed, e.g. flame retardants, heat stabilizers, light stabilizers, antioxidants, and lubricants, can also be added into the resin composition.

The resin composition of the present invention can be prepared by dissolving, mixing, prepolymerizing, pre-reacting, and stirring the epoxy resin (A) containing no naphthalene ring skeleton, the phenolic curing agent (B) containing no naphthalene ring skeleton, the high molecular-weight resin (C) having structures represented by at least Formulae (2), (3) and (4) from Formulae (1), (2), (3) and (4) and a weight-average molecular weight of 100,000 to 200,000, and the inorganic filler (D).

To dissolve the resin, it is necessary to use an organic solvent, as long as various resins can be completely dissolved and do not separate during mixing. Examples include alcohols such as methanol, ethanol and butanol, ethers such as ethyl cellosolve, butyl cellosolve, ethylene glycol methyl ether, diethylene glycol ethyl ether and diethylene glycol butyl ether, ketones such as acetone, butanone, methyl ethyl ketone, methyl isobutyl ketone and cyclohexanone, aromatic hydrocarbons such as toluene, xylene and mesitylene, esters such as ethoxyethyl acetate and ethyl acetate, and nitrogen-containing solvents such as N,N-dimethylformamide, N,N-dimethylacetamide and N-methyl-2-pyrrolidone. The above-mentioned solvents may be used alone, or in combination as required.

The present invention also provides prepregs, laminates and metal foil-clad laminates prepared from the epoxy resin composition above.

The prepreg of the present invention is prepared from the resin composition of the present invention in a semi-cured state and a substrate. Specifically, the prepreg is prepared by a process in which the substrate is impregnated with the resin composition in a varnish state, and heated to volatilize the solvent and transformed into a semi-cured state.

The substrate described in the present invention is not particularly limited, and can be selected from the known substrates used to make various printed circuit board materials. Specifically, inorganic fibers (glass fibers such as E glass, D glass, L glass, M glass, S glass, T glass, NE glass, Q glass, and quartz), organic fibers (such as polyimide, polyamide, polyester, polyphenylene ether, liquid crystal polymer, etc.). The substrate is usually in a form of woven fabric, non-woven fabric, roving, short fiber, fiber paper, etc. Among the above-mentioned substrates, the substrate of the present invention is preferably glass fiber cloth.

The laminate of the present invention includes at least one prepreg as described above.

The metal foil-clad laminate of the present invention includes at least one piece of the above-mentioned prepreg and metal foil(s) covered on one or both sides of the prepreg(s). For example, a metal foil-clad laminate can be manufactured by stacking 1 to 20 sheets of prepregs and laminating prepregs on one or both sides of which metal foils such as copper and aluminum are arranged.

Hereinafter, the present invention will be specifically explained by using the examples and comparison examples.

<Resin Composition Raw Materials>

Epoxy resin (A1): Biphenyl aralkyl type novolac epoxy resin (NC-3000H, provided by Nippon Kayaku Co., Ltd.);

Epoxy resin (A2): Phenyl aralkyl type novolac epoxy resin (NC-2000, provided by Nippon Kayaku Co., Ltd.);

Epoxy resin (A3): Dicyclopentadiene novolac epoxy resin (HP-7200H, provided by DIC Corporation);

Epoxy resin (A4): Bisphenol A epoxy resin (EPICLON® 1055, provided by DIC Corporation);

Epoxy resin (A5): Naphthol novolac epoxy resin (NC-7300L, provided by Nippon Kayaku Co., Ltd.);

Phenolic curing agent (B1): Biphenyl aralkyl novolac resin (MEHC-7851H, provided by Meiwa Chemical Co., Ltd.);

Phenolic curing agent (B2): Dicyclopentadiene novolac resin (DPNE9501, provided by Jiashengde);

Phenolic curing agent (B3): Novolac resin (HF-4M, provided by Meiwa Chemical Co., Ltd.);

Phenolic curing agent (B4): naphthol novolac resin (MEH-7000, provided by Meiwa Chemical Co., Ltd.);

High molecular-weight resin (C1): "PMS-22-1" manufactured by Nagase ChemteX, with a weight-average molecular weight of 100,000 and an epoxy value of 0.63 eq/kg;

High molecular-weight resin (C2): "PMS-22-1 with modified MW1" manufactured by Nagase ChemteX, with a weight-average molecular weight of 200,000 and an epoxy value of 0.63 eq/kg;

High molecular-weight resin (C3): "PMS-22-1 with modified MW1" manufactured by Nagase ChemteX, with a weight-average molecular weight of 150,000 and an epoxy value of 0.63 eq/kg;

High molecularweight resin (C4): "PMS-22-1 with modified EP1" manufactured by Nagase ChemteX, with a weight-average molecular weight of 100,000 and an epoxy value of 0.40 eq/kg;

High molecular-weight resin (C5): "PMS-22-2" manufactured by Nagase ChemteX, with a weight-average molecular weight of 100,000 and an epoxy value of 0.13 eq/kg High molecular-weight resin (C6): "PMS-22-2 with modified EP1" manufactured by Nagase ChemteX, with a weight-average molecular weight of 100,000 and an epoxy value of 0.08 eq/kg High molecular-weight resin (C7): "PMS-22-1 with modified MW2" manufactured by Nagase ChemteX, with a weight-average molecular weight of 80,000, and an epoxy value of 0.63 eq/kg High molecular-weight resin (C8): "PMS-22-1 with modified MW3" manufactured by Nagase ChemteX, with a weight-average molecular weight of 400,000, and an epoxy value of 0.63 eq/kg, wherein the resins (C1)-(C8) have the structures represented by Formula (1), (2), (3) and (4), $k+l+m+n \leq 1$; $0 \leq k \leq 0.10$, $0.01 \leq l \leq 0.30$; $0.20 \leq m \leq 0.80$; $0.05 \leq n \leq 0.20$.

Inorganic filler (D1): Spherical silica ("SC2050-MB" manufactured by Admatechs, D50: 0.5μm)

Inorganic filler (D2): Spherical alumina ("AO-502" manufactured by Admatechs, D50: 0.7 μm)

Inorganic filler (D3): Boehmite ("BG-601" manufactured by Estone, D50: 0.5 μm)

Accelerator (E): 2-ethyl-4-methylimidazole ("2E4MI" manufactured by Shikoku Chemical Co., Ltd.)

Woven substrate: glass fiber cloth (1078 glass fiber cloth manufactured by Nittobo, unit weight 47 g/m$^2$)

All components in the examples and comparison examples of the present invention are calculated on the basis of solids.

(Prepreg)

The epoxy resin, phenolic curing agent, high molecular-weight resin, inorganic filler and accelerator were mixed according to the mass parts shown in Table 1 (Examples) or Table 2 (Comparison Examples), and dissolved and diluted with propylene glycol methyl ether and butanone to prepare the resin composition in a state of varnish.

Then 1078 glass fiber cloth manufactured by Nittobo was impregnated with the resin composition in the varnish state, heated and dried in a blast oven at 150-170° C. for 5-7 minutes to convert the resin composition in the varnish state into a semi-cured resin composition. The thickness of the composition was controlled at 90 μm to produce a prepreg.

(Metal Foil-Clad Laminate)

2 and 9 sheets of the above-mentioned prepregs were respectively overlapped, laminated with electrolytic copper foils having a thickness of 18 m on both sides thereof, and cured in a press for 2 hours, wherein the curing pressure was 45 kg/cm$^2$; and the curing temperature was 190° C.

(Laminate)

After the metal foils of the metal foil-clad laminate were etched, a laminate with a thickness of approximately 0.18 mm and 0.81 mm was obtained.

For the laminates and metal foil-clad laminates prepared by using the resin composition of the present invention, the heat resistance (Tg, T300), modulus, and coefficient of thermal expansion (CTE) in the plane direction were tested, and the test results are further explained and described as follows.

The test methods of the physical data in the table are as follows.

Glass transition temperature (Tg): The copper foils were etched away from copper clad laminate samples prepared in the Examples and Comparison Examples. The laminate with a length of 60 mm, a width of 8-12 mm, and a thickness of 0.81 mm was taken as a sample, measured with a dynamic mechanical thermal analyzer (DMA), heated in a rate of 10° C./min. The result was the transformation peak temperature of tanδ, in ° C.

T300 with copper: A metal foil-clad laminate with a length of 6.5 mm, a width of 6.5 mm, and a thickness of 0.81 mm was taken as a sample, baked in an oven at 105° C. for 2 hours and then cooled to room temperature in a desiccator, measured with the thermal analysis mechanical method (TMA), heated in a rate of 10° C./min from room temperature to 300° C., and maintained at the temperature of 300° C. The delamination time was the time from the inflection point of the constant temperature to the delamination, and the unit thereof was min. For the samples that started to stratify below 300° C., the temperature at the beginning of stratifying was recorded in ° C.

Coefficient of thermal expansion in the XY directions: The copper foils were etched away from copper clad laminate samples prepared in the Examples and Comparison Examples. The laminate with a length of 60 mm, a width of 4 mm, and a thickness of 0.18 mm was taken as a sample. The warp direction of the glass fiber was the X direction, and the weft direction of the glass fiber was the Y direction. The sample was dried in an oven at 105° C. for 1 hour and then cooled to room temperature in a desiccator, measured with the thermal analysis mechanical method (TMA), heated in a rate of 10° C./min from room temperature to 300° C. The thermal expansion coefficient in the plane direction from 50° C. to 130° C. was measured, and the unit was ppm/° C.

Peel strength: A metal foil-clad laminate with a length of 50 mm and a width of 50 mm was taken as a sample. A sample strip with a metal foil width of 3.0 mm was prepared by using tape or other methods to etch. The metal foil was peeled from the laminate by applying a pressure in the vertical direction at a speed of 50 mm/min with a peel resistance tester or other equivalent instruments, so as to obtain the peel strength of the metal foil-clad laminate in N/mm.

Flexural modulus: The copper foils were etched away from the copper clad laminate samples prepared in the examples and comparison examples. The laminate with a length of 76.2 mm, a width of 25.4 mm and a thickness of 0.81 mm was taken as a sample, and measured by the material test machine with a span of 25.4 mm. The unit was Gpa.

Scanning electron microscope (SEM): Observe with a SEM whether the laminate filler was evenly dispersed. Sample pretreatment: The laminate was cut into a small sample smaller than the sample stage, and the shear surface was smoothed by ion milling. The oil on the shear surface was fully cleaned, and the shear surface was completely dried. Finally, the shear surface which was ground to smooth was sprayed with a metal layer of about 10 nm, generally gold. The morphology of the cross-section of the laminate was observed under high vacuum conditions with a scanning electron microscope, and zoomed in to observe the dispersion and distribution of the inorganic filler. If agglomeration or local uneven distribution of the filler was observed, it was judged that the filler was unevenly dispersed.

TABLE 1

| No. | 1 | 2 | 3 | 4 | 5 | 6 | 7 | 8 | 9 | 10 |
|---|---|---|---|---|---|---|---|---|---|---|
| Epoxy resin A1 | 25 | | | 50 | | | | 25 | 25 | 25 |
| Epoxy resin A2 | | 25 | | | 50 | | | | | |
| Epoxy resin A3 | | | 25 | | | 50 | | | | |
| Epoxy resin A4 | 25 | 25 | 25 | | | | 50 | 25 | 25 | 25 |
| Phenolic curing agent B1 | 25 | 25 | 25 | 25 | 25 | 25 | 25 | | 50 | |
| Phenolic curing agent B2 | | | | | | | | 25 | | 50 |
| Phenolic curing agent B3 | 25 | 25 | 25 | 25 | 25 | 25 | 25 | 25 | | |
| High molecular-weight resin C1 | 50 | 50 | 50 | 50 | 50 | 50 | 50 | 50 | 50 | 50 |
| High molecular-weight resin C2 | | | | | | | | | | |
| High molecular-weight resin C3 | | | | | | | | | | |
| High molecular-weight resin C4 | | | | | | | | | | |
| High molecular-weight resin C5 | | | | | | | | | | |

TABLE 1-continued

|  | | | | | | | | | | |
|---|---|---|---|---|---|---|---|---|---|---|
| Inorganic filler D1 | 30 | 30 | 30 | 30 | 30 | 30 | 30 | 30 | 30 | 30 |
| Inorganic filler D2 | | | | | | | | | | |
| Inorganic filler D3 | | | | | | | | | | |
| Accelerator E | 0.5 | 0.5 | 0.5 | 0.5 | 0.5 | 0.5 | 0.5 | 0.5 | 0.5 | 0.5 |
| Tg (° C.) | 175 | 175 | 175 | 180 | 180 | 180 | 170 | 175 | 180 | 185 |
| T300 with copper (min) | >60 | >60 | >60 | >60 | >60 | >60 | >60 | >60 | >60 | >60 |
| X-direction coefficient of thermal expansion (ppm/° C.) | 9 | 9 | 9 | 9 | 9 | 9 | 9 | 9 | 9 | 9 |
| Y-direction coefficient of thermal expansion (ppm/° C.) | 9 | 9 | 9 | 9 | 9 | 9 | 9 | 9 | 9 | 9 |
| Peel strength (N/mm) | 1.0 | 1.0 | 1.0 | 1.0 | 1.0 | 1.0 | 1.0 | 1.0 | 1.0 | 1.0 |
| Flexural modulus (Gpa) | 10 | 10 | 10 | 10 | 10 | 10 | 10 | 10 | 10 | 10 |
| Whether the filler is evenly dispersed | Yes | Yes | Yes | Yes | Yes | Yes | Yes | Yes | Yes | Yes |

(Examples)

| No. | 11 | 12 | 13 | 14 | 15 | 16 | 17 | 18 | 19 | 20 |
|---|---|---|---|---|---|---|---|---|---|---|
| Epoxy resin A1 | 25 | | 25 | 25 | 25 | 25 | 25 | 25 | 25 | 25 |
| Epoxy resin A2 | | | | | | | | | | |
| Epoxy resin A3 | | | | | | | | | | |
| Epoxy resin A4 | 25 | 50 | 25 | 25 | 25 | 25 | 25 | 25 | 25 | 25 |
| Phenolic curing agent B1 | | | 25 | 25 | 25 | 25 | 25 | 25 | 25 | 25 |
| Phenolic curing agent B2 | | | | | | | | | | |
| Phenolic curing agent B3 | 50 | 50 | 25 | 25 | 25 | 25 | 25 | 25 | 25 | 25 |
| High molecular-weight resin C1 | 50 | 50 | | | | | 8 | 95 | 50 | 50 |
| High molecular-weight resin C2 | | | 50 | | | | | | | |
| High molecular-weight resin C3 | | | | 50 | | | | | | |
| High molecular-weight resin C4 | | | | | 50 | | | | | |
| High molecular-weight resin C5 | | | | | | 50 | | | | |
| Inorganic filler D1 | 30 | 30 | 30 | 30 | | | 30 | 30 | 5 | 100 |
| Inorganic filler D2 | | | | | 30 | | | | | |
| Inorganic filler D3 | | | | | | 30 | | | | |

TABLE 1-continued

| | | | | | | | | | | |
|---|---|---|---|---|---|---|---|---|---|---|
| Accelerator E | 0.5 | 0.5 | 0.5 | 0.5 | 0.5 | 0.5 | 0.5 | 0.5 | 0.5 | 0.5 |
| Tg (° C.) | 185 | 155 | 175 | 175 | 175 | 175 | 175 | 175 | 175 | 175 |
| T300 with copper (min) | >60 | 30 | >60 | >60 | >60 | >60 | >60 | 40 | >60 | >60 |
| X-direction coefficient of thermal expansion (ppm/° C.) | 9 | 12 | 9 | 9 | 9 | 9 | 11 | 6 | 9 | 7 |
| Y-direction coefficient of thermal expansion (ppm/° C.) | 9 | 12 | 9 | 9 | 9 | 9 | 11 | 6 | 9 | 7 |
| Peel strength (N/mm) | 1.0 | 1.0 | 1.0 | 1.0 | 1.0 | 1.0 | 1.0 | 1.0 | 1.0 | 0.9 |
| Flexural modulus (Gpa) | 10 | 10 | 10 | 10 | 10 | 10 | 12 | 8 | 9 | 14 |
| Whether the filler is evenly dispersed | Yes | Yes | Yes | Yes | Yes | Yes | Yes | Yes | Yes | Yes |

TABLE 2

(comparison examples)

| No. | 1 | 2 | 3 | 4 | 5 | 6 | 7 |
|---|---|---|---|---|---|---|---|
| Epoxy resin A1 | | | 25 | 25 | 25 | 25 | 25 |
| Epoxy resin A4 | | 50 | 25 | 25 | 25 | 25 | 25 |
| Epoxy resin A5 | 50 | | | | | | |
| Phenolic curing agent B1 | | | 25 | 25 | 25 | 25 | 25 |
| Phenolic curing agent B3 | 50 | | 25 | 25 | 25 | 25 | 25 |
| Phenolic curing agent B4 | | 50 | | | | | |
| High molecular-weight resin C1 | | 50 | | | | | 140 |
| High molecular-weight resin C6 | | | 50 | | | | |
| High molecular-weight resin C7 | | | | 50 | | | |
| High molecular-weight resin C8 | | | | | 50 | | |
| Inorganic filler D1 | 30 | 30 | 30 | 30 | 30 | 30 | 30 |
| Accelerator E | 0.5 | 0.5 | 0.5 | 0.5 | 0.5 | 0.5 | 0.5 |
| Tg (° C.) | 175 | 175 | 175 | 175 | 175 | 175 | Undetectable |
| T300 with copper (min) | >60 | >60 | 50 | 40 | >60 | >60 | 5 |
| X-direction coefficient of thermal expansion (ppm/° C.) | 9 | 9 | 9 | 9 | 9 | 16 | 6 |
| Y-direction coefficient of thermal expansion (ppm/° C.) | 9 | 9 | 9 | 9 | 9 | 16 | 6 |
| Peel strength (N/mm) | 1.0 | 1.0 | 1.0 | 1.0 | 1.0 | 1.0 | 0.5 |
| Flexural modulus (Gpa) | 14 | 14 | 10 | 10 | 10 | 15 | 6 |
| Whether the filler is evenly dispersed | Yes | Yes | Yes | Yes | No | Yes | No |

It can be seen from Tables 1 and 2 that, if the epoxy resin (A) or phenolic curing agent (B) used contains a naphthalene ring skeleton (Comparison Examples 1 and 2), the modulus will increase; if the epoxy value of the high molecular-weight resin (C) used is lower than 0.10 ep/kg (Comparison Example 3), the heat resistance will be affected by insufficient crosslinking density; if the weight-average molecular weight of the high molecular-weight resin (C) used is less than 100,000 (Comparison Example 4), the heat resistance will decrease; if the weight-average molecular weight of the high molecular-weight resin (C) used is higher than 200,000 (Comparison Example 5), the filler will be unevenly dispersed; if the high molecular-weight resin (C) (Comparison Example 6) is not added, the resin composition does not have low modulus and low coefficient of thermal expansion; if the amount of the high molecular-weight resin (C) is too high (Comparison Example 7), the heat resistance and peel strength of the resin composition are severely reduced, and the inorganic filler is unevenly dispersed. Tg cannot be measured since low-elasticity resins dominate.

The resin composition of the present invention contains an epoxy resin and a phenolic curing agent without a naphthalene ring skeleton, one of which contains an aralkyl group or a dicyclopentadienyl structure, and contains a high molecular-weight resin having structures shown in Formulae (1), (2), (3) and (4), and a weight-average molecular weight of 100,000 to 200,000, so as to increase the curing degree of the resin composition. The prepreg prepared from the resin composition has high heat resistance, low modulus and coefficient of thermal expansion. Neither of the epoxy resin (A) and the phenolic curing agent (B) used in Example 12 contains an aralkyl group or a dicyclopentadienyl structure, and the effect of improving heat resistance and reducing the coefficient of thermal expansion is not as good as Examples 1-11 Therefore, the epoxy resin and/or phenolic curing agent contain(s) an aralkyl group or a dicyclopentadienyl structure are/is preferred. The amount of the high molecular-weight resin (C) used in Example 17 is slightly less than 10 parts by weight, and the modulus and coefficient of thermal expansion of the resin composition are slightly higher than those in Examples 1-11. The amount of the high molecular-weight resin (C) used in Example 18 is slightly higher than 90 parts by weight, so that the filler will be unevenly dispersed, and the heat resistance will decrease.

The examples above are not used to limit the content of the composition of the present invention. Any minor modifications, equivalent changes and modifications made to the above examples based on the technical essence of the present invention or the weight parts or content of the composition still fall within the scope of the technical solution of the present invention.

The applicant declares that the present invention uses the above-mentioned examples to illustrate the detailed composition of the present invention, but the present invention is not limited to the above-mentioned detailed composition, which does not mean that the present invention must rely on the above-mentioned detailed composition to be implemented. Those skilled in the art should understand that any improvements of the present invention, equivalent replacements of each raw material of the product of the present invention, additions of auxiliary components, or selections of specific methods all fall within the scope of protection and disclosure of the present invention.

The invention claimed is:

1. An epoxy resin composition, wherein the epoxy resin composition comprises
    an epoxy resin (A),
    a phenolic curing agent (B),
    a high molecular-weight resin (C), having structures shown in Formulae (1), (2), (3) and (4), and a weight-average molecular weight of 100,000-200,000; and
    an optional inorganic filler (D);
    wherein the content of the epoxy resin (A) containing a naphthalene ring skeleton and the phenolic curing agent (B) containing a naphthalene ring skeleton is 0%,

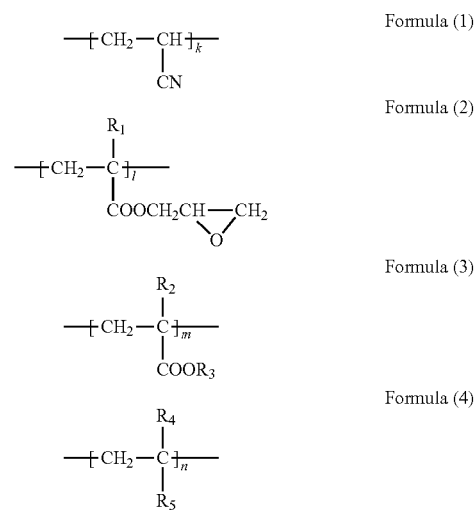

wherein k, l, m and n are mole fractions; $k+l+m+n \leq 1$; $0 \leq k \leq 0.10$; $0.01 \leq l \leq 0.30$; $0.20 \leq m \leq 0.80$; $0.05 \leq n \leq 0.20$; in Formula (2), $R_1$ is a hydrogen atom or an alkyl group with 1-8 carbon atoms; in Formula (3), $R_2$ and $R_3$ are each independently a hydrogen atom or an alkyl group with 1-8 carbon atoms; in Formula (4), $R_4$ is a hydrogen atom or an alkyl group with 1-8 carbon atoms, and $R_5$ is selected from the group consisting of an alkyl group with 1-8 carbon atoms, phenyl (Ph), —COO(CH$_2$)$_2$Ph and —COOCH$_2$Ph;

wherein the epoxy value of the high molecular-weight resin (C) is within the range of 0.10-0.80 eq/kg.

2. The epoxy resin composition claimed in claim 1, wherein $R_1$ is a hydrogen atom or a methyl group; $R_2$ is a hydrogen atom or a methyl group; $R_3$ is an alkyl group with 1-8 carbon atoms; and $R_4$ is a hydrogen atom or a methyl group.

3. The epoxy resin composition claimed in claim 1, wherein the epoxy resin (A) and/or the phenolic curing agent (B) contain(s) an aralkyl group or a dicyclopentadiene structure.

4. The epoxy resin composition claimed claim 1, wherein based on the total weight of the epoxy resin (A) and the phenolic curing agent (B) as 100 parts by weight, the high molecular-weight resin (C) is present in an amount of 10-90 parts by weight.

5. The epoxy resin composition claimed in claim 1, wherein based on the total weight of the epoxy resin (A) and the phenolic curing agent (B) as 100 parts by weight, the inorganic filler (D) is present in an amount of 0 to 100 parts by weight.

6. A prepreg comprising a substrate and the epoxy resin composition claimed in claim 1 attached to the substrate by impregnation or coating.

7. A metal foil-clad laminate comprising at least one prepreg claimed in claim 6 and metal foil(s) covered on one or both sides of the prepreg(s).

8. A prepreg comprising a substrate and the epoxy resin composition claimed in claim 2 attached to the substrate by impregnation or coating.

9. A prepreg comprising a substrate and the epoxy resin composition claimed in claim 3 attached to the substrate by impregnation or coating.

10. A prepreg comprising a substrate and the epoxy resin composition claimed in claim 4 attached to the substrate by impregnation or coating.

11. A prepreg comprising a substrate and the epoxy resin composition claimed in claim 5 attached to the substrate by impregnation or coating.

12. The epoxy resin composition claimed in claim 2, wherein based on the total weight of the epoxy resin (A) and the phenolic curing agent (B) as 100 parts by weight, the inorganic filler (D) is present in an amount of 0 to 100 parts by weight.

13. The epoxy resin composition claimed in claim 1, wherein based on the total weight of the epoxy resin (A) and the phenolic curing agent (B) as 100 parts by weight, the inorganic filler (D) is present in an amount of 10 to 70 parts by weight.

14. The epoxy resin composition claimed in claim 2, wherein based on the total weight of the epoxy resin (A) and the phenolic curing agent (B) as 100 parts by weight, the inorganic filler (D) is present in an amount of 10 to 70 parts by weight.

15. The epoxy resin composition claimed claim 2, wherein based on the total weight of the epoxy resin (A) and the phenolic curing agent (B) as 100 parts by weight, the high molecular-weight resin (C) is present in an amount of 10-90 parts by weight.

16. The epoxy resin composition claimed claim 1, wherein based on the total weight of the epoxy resin (A) and the phenolic curing agent (B) as 100 parts by weight, the high molecular-weight resin (C) is present in an amount of 20-85 parts by weight.

17. The epoxy resin composition claimed claim 1, wherein based on the total weight of the epoxy resin (A) and the phenolic curing agent (B) as 100 parts by weight, the high molecular-weight resin (C) is present in an amount of 30-70 parts by weight.

18. The epoxy resin composition claimed claim 2, wherein based on the total weight of the epoxy resin (A) and the phenolic curing agent (B) as 100 parts by weight, the high molecular-weight resin (C) is present in an amount of 20-85 parts by weight.

19. The epoxy resin composition claimed claim 2, wherein based on the total weight of the epoxy resin (A) and the phenolic curing agent (B) as 100 parts by weight, the high molecular-weight resin (C) is present in an amount of 30-70 parts by weight.

20. The epoxy resin composition claimed claim 2, wherein based on the total weight of the epoxy resin (A) and the phenolic curing agent (B) as 100 parts by weight, the high molecular-weight resin (C) is present in an amount of 70 parts by weight.

\* \* \* \* \*